B. B. KEYES.
PRESSURE GAGE.

No. 182,202. Patented Sept. 12, 1876.

Witnesses.
Chas. J. Taylor
Daniel Flaherty

Inventor:
Benjamin B. Keyes
per
Brown Brothers
Attorneys

UNITED STATES PATENT OFFICE.

BENJAMIN B. KEYES, OF CHARLESTOWN, ASSIGNOR TO WILLIAM H. IRELAND, OF BOSTON, MASSACHUSETTS.

IMPROVEMENT IN PRESSURE-GAGES.

Specification forming part of Letters Patent No. 182,202, dated September 12, 1876; application filed April 10, 1871.

*To all whom it may concern:*

Be it known that I, BENJAMIN B. KEYES, of Charlestown, in the county of Middlesex, and State of Massachusetts, have invented a new and useful Improved Mode of Testing Pressure-Gages; and that the following is a full and exact description of the same, reference being had to the accompanying plate of drawings.

The mode of testing embraced by the present invention is more particularly applicable to the Bourdon pressure-gage, so known.

My improved method of testing the pressure-tube of said gage consists in having the tube clear of steam or liquid pressure, and in applying to the tube, at its free end, noted weights, more or less in number, to distend it in the same line or direction as steam distends it when admitted thereto, such a number of weights being employed that either separately or in combination more or less with each other the tube can be tested at a proper number of points of its action, to assure that the gage is correct and reliable.

One form of carrying out my improved mode of testing the gage is illustrated in the accompanying plate of drawings—

Figure 1:
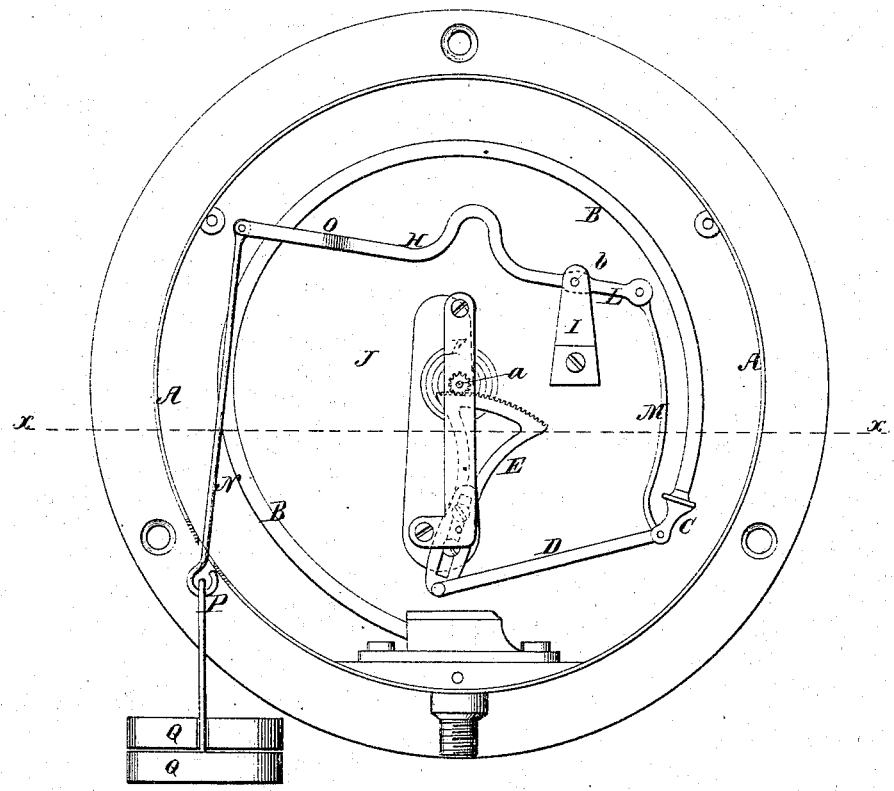
Figure 2:
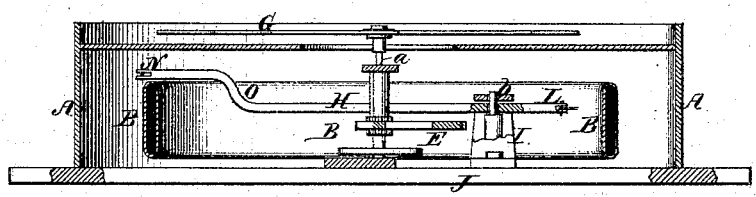
Figure 3:
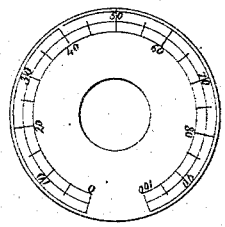

Figure 1 being a face view of the interior to the gage, showing an arrangement of parts to distend the gage-tube as desired by the application of weights; Fig. 2, a transverse section in plane of line $x\ x$, Fig. 1; Fig. 3, a face view of a dial on a reduced scale.

A in the drawings represents a case or box made of circular shape, and containing a curved tube, B, fixed at one end and loose at the other, C, but there connected, through rod D, to and with a sector-gear, E, working a pinion-wheel, F, on spindle $a$, that carries the index or pointer G. The construction and arrangement of the several parts above referred to are substantially similar to those employed in the Bourdon steam-gage, as now constructed, and, being familiar to all conversant with such gage, needs no further description herein; H, a lever hung on a fulcrum, $b$, of standard I, fixed to back plate J of casing A.

This lever extends nearly the entire length of the box A, and is located with reference to the free end C of the steam-tube B, as shown in the drawings, being connected by its short arm L to said end C of tube B through a pitman-rod, M; N, a rod pivoted to extreme end of long arm O, to lever H, and extended therefrom to the outside of the case or box A, and at such end formed with an eye, P, for the suspension of a series of weights, Q, the denomination of amount of pressure that each weight represents being preferably denoted thereon.

The construction, location, arrangement, and connection of lever H with regard to the pressure-tube above described must be, and is, as shown, such that a given weight or weights applied to the long arm Q of the lever, either directly or through the rod, N, will cause an outward distension or a straightening out of the tube precisely similar to its distension by steam, of a pressure equal to that of the said suspended weight or weights combined with the leverage of lever H, should steam be admitted to the tube.

With a series of weights, either in themselves continuously or by combination with each other, suitable for the lever H by suspending them to its long arm Q to distend the tube with a force from ten to one hundred pounds in regular amounts of ten, the leverage of lever acting in conjunction with the weight or weights, it is plainly apparent by applying them to the lever H in regular or irregular order or succession, and marking the dial-face according to the pointings of the index-hand from the application of each weight or combination of weights, that a correct dial or indicating-face for such tube, so far as variations of pressure in tens, will and must be produced, securing, should steam of a pressure of any of the numbers noted then be admitted, a correct and true recording of the same by the index hand or pointer on said graduated dial; and that then, at any time thereafter during the time the gage is in use, without necessarily removing the gage, by simply shutting off steam and allowing it to escape from the tube, and then applying said weights as described, the errors, if any, of the tube will be indicated, for, should the tube with the weight and leverage for ten pounds (10 lbs.) indicate more or less than that number, then to that extent the "tube is out," if it may be so termed, the correction of which is secured by adjusting the connection of rod D with the sector-gear E, as ordinarily with Bourdon steam-gages, therefore needing no particular description herein.

The same may be observed for the remaining weights, and thus, with proper care and attention, it is obvious that the gage-tube can be accurately tested and made correct for any degree of pressure from 0 to 100, more or less, according to the range which the gage is to have.

I am well aware that in Letters Patent of the United States issued to H. J. H. King, dated November 9, 1869, and numbered 96,705, for improvement in pressure-gages, the use of a given weight is claimed for testing at any time the accuracy of the spring; and that in the specification forming a part of said patent it is particularly described with reference to the Bourdon steam-gage, and as applied thereto so as to act against the pressure of the steam in the pressure-tube, and when steam is in it.

I am also well aware that in Letters Patent of Great Britain, dated November 28, 1868, issued to H. J. H. King, for improvements in pressure-gages, the testing of gages is described as accomplished by applying a weight to the part of the gage receiving the pressure to act with or against the pressure of steam in said part, steam being at the same time within said part or tube.

In both instances above cited steam-pressure is within the tube when a weight is applied to the tube to test it, the weight in the one case pulling against the steam-pressure, and in the other case with it, turning the indicating hand or pointer back in the one application, and in the other turning it still farther forward on the dial-face, errors in the gage being stated to be determined in both cases through the pointer and a scale on the dial-face called the "test-scale," in addition to the ordinary or "working-scale," said additional or test scale being numbered in accordance with the working-scale and suitably arranged on the dial-face with reference to the working-scale.

As an illustration of the testing of a pressure-gage under the King United States patent of 1869, suppose the gage to indicate a pressure on working-scale of sixty pounds; if then the testing-weight is applied, the pointer turning back on the dial, must point to 60 on the test-scale for the gage to be correct, and the same may be said of any of the other degrees of pressure within the limit of the gage.

Experiments made under such mode of testing demonstrate that the pointer, at whatever degree of pressure indicated by it on the working-scale when the weight is applied, will always turn back and point to a graduation of the test-scale corresponding to that indicated by the pointer on the working-scale previous to the application of weight, and whether the gage is correct or not, consequently demonstrating that mode of testing to be unreliable and incorrect.

As illustrations of some of the experiments made under said mode of testing, the pointer of a Bourdon steam-gage adapted to be tested according thereto, was, in one instance, set ten degrees (10°) out, causing the gage to indicate one hundred degrees on working-scale when ninety degrees was the actual pressure. The test-weight was then applied, turning back the pointer to 100° on the test-scale.

In another instance the pointer was placed twenty degrees out, causing the gage to indicate one hundred and forty degrees pressure, when one hundred and twenty degrees was the actual pressure; and in another the pointer was placed forty degrees out, causing the gage to indicate one hundred and twenty degrees, when eighty degrees was the actual pressure, and in both cases with the weight applied, the pointer was turned back, and indicated on the test-scale corresponding to its indications on the working-scale. Thus in all cases the gage, out, indicated, with the test-weight applied, it was correct, proving a gage in that way could not be tested.

Substantially similar results are also obtained by applying the weight to act with the pressure, the difficulty existing in the fact that pressure is in the tube.

By my invention, the tube itself, free from internal pressure, is subjected to the weight in the direction described, distinctly and unerringly showing the sensitiveness of the tube itself to pressure; also, by my invention only one scale to the gage is required, and that the working, it being all-sufficient for both working and testing the gage.

My invention also requires the use of a series of weights, whereas under the King patents only one, and that a given weight, is used, others being absolutely unnecessary.

I do not claim the application of a lever or levers and a weight to the pressure-tube; but What I do claim as my invention, and desire to secure by Letters Patent, is—

The mode of testing pressure-gages, substantially as herein described, the same consisting in having the pressure-tube free from internal steam or liquid pressure, and in then applying to the tube at its free end, directly or through a system of leverage, weights, more or less in number, having a known action on the tube, in such manner as to act upon the tube as steam would when admitted, as set forth.

B. B. KEYES.

Witnesses:
CHAS. J. TAYLOR,
DANIEL FLAHERTY.